United States Patent [19]

Nishimatsu et al.

[11] Patent Number: 4,596,747
[45] Date of Patent: Jun. 24, 1986

[54] MAGNETIC RECORDING MEDIUM

[75] Inventors: Masaharu Nishimatsu, Komoro; Toshiaki Ide, Saku; Yuichi Kubota, Komoro; Yoshiaki Saito; Shigeru Shimada, both of Saku, all of Japan

[73] Assignee: TDK Corporation, Tokyo, Japan

[21] Appl. No.: 631,208

[22] Filed: Jul. 16, 1984

[30] Foreign Application Priority Data

Aug. 9, 1983 [JP] Japan ................................ 58-144413

[51] Int. Cl.⁴ .............................................. G11B 5/70
[52] U.S. Cl. ................................. 428/694; 360/134;
360/135; 360/136; 427/44; 427/128; 427/131;
428/323; 428/408; 428/425.9; 428/900;
428/522
[58] Field of Search ............... 428/425.9, 694, 900,
428/695, 408, 522; 528/85; 427/131, 44, 128;
360/134–135

[56] References Cited

U.S. PATENT DOCUMENTS

| 4,132,552 | 1/1979 | Paesschen | 427/131 |
| 4,183,976 | 1/1980 | Yamada | 427/130 |
| 4,210,703 | 7/1980 | Scantlin | 427/131 |
| 4,275,113 | 6/1981 | Saito | 427/131 |
| 4,468,436 | 8/1984 | Okita | 428/425.9 |
| 4,487,802 | 12/1984 | Miyoshi | 428/694 |
| 4,511,617 | 4/1985 | Hideyama | 428/408 |
| 4,511,629 | 4/1985 | Konno | 428/694 |

FOREIGN PATENT DOCUMENTS 84039 6/1980 Japan .................................. 427/131

*Primary Examiner*—Ellis P. Robinson
*Attorney, Agent, or Firm*—Oblon, Fisher, Spivak, McClelland & Maier

[57] ABSTRACT

A magnetic recording medium comprising a transparent plastic film substrate, a primer coating layer formed on the substrate and a magnetic layer for magnetic recording formed on the primer coating layer, wherein said primer coating layer is formed by dispersing carbon black in a radiation curable coating material composed essentially of at least one oligomer or polymer containing at least one radiation curable unsaturated double bond per molecule and curing the resulting dispersion by radiation.

5 Claims, No Drawings

MAGNETIC RECORDING MEDIUM

BACKGROUND OF THE INVENTION
1. Field of the Invention

The present invention relates to a magnetic recording medium having excellent antistatic property and surface smoothness as well as good electric characteristics.

2. Description of the prior art

Most of presently available magnetic media such as audio tapes, video tapes or magnetic disks, are usually prepared by applying a coating material containing a magnetizable metal powder such as iron oxide, on a film substrate such as a plastic film made of e.g. polyester or polyvinyl chloride, or paper, followed by orientation, drying, calendering and, if necessary, curing.

Various thermoplastic resins or thermosetting resins have been used as the binder for the coating material. However, it sometimes happens that the adhesion tends to be weak for the reason that the concentration of a pigment in the coating material is high, or the surface of the film substrate is not adequately wetted. Accordingly, it is likely that when a strong stress is applied instantaneously to the tape, the magnetic layer falls off.

It has been proposed to provide a non-magnetic primer coating layer on the film substrate to improve the adhesion. Various thermoplastic resins or themosetting resins have been employed as the resin binder for the formation of the primer coating layer. In the case where a thermoplastic resin primer is used, there is a problem such that when a magnetic coating material containing a substantial amount of a solvent, is applied, it is likely that the previously formed primer coating layer is swelled or dissolved by the solvent, whereby the coating will be uneven and the smoothness of the magnetic layer will be lost. In the case where a thermosetting resin primer is employed, the above problem may be avoided, but there is an industrial disadvantage that the heat-curing treatment requires a long period of time, whereby it is impossible to continuously form the magnetic layer.

The above-mentioned problem in the primer treatment of the magnetic recording medium, can be solved by using a predetermined radiation curable resin as the binder for forming the primer coating layer. Namely, it is thereby possible to form a primer coating layer having excellent solvent resistance and adhesion by treatment for a short period of time, and continously coat the magnetic layer to obtain a magnetic recording medium having excellent surface smoothness, electric characteristics and mechanical strength.

Namely, in a magnetic recording medium prepared by applying a non-magnetic primer coating layer on a substrate, followed by the formation of a magnetic layer, the above-mentioned effect can be attained by a magnetic recording medium wherein the primer coating layer is formed by applying radiation to a radiation curable coating material such as a coating material comprising one or more oligomers or polymers containing at least two (meth)acryloyl groups, each having a molecular weight of at least 200 and, if necessary, a solvent or a photopolymerization initiator.

When coated on a substrate and irradiated, such a primer coating material instantaneously undergoes, crosslinking and forms a coating layer having a three-dimensional network structure. The coating layer thus formed, does not undergo swelling even when contacted with a solvent at the time of the application of the magnetic layer, whereby it is possible to maintain the smoothness of the magnetic layer.

The magnetic recording medium thus obtained, will have excellent surface smoothness and good adhesion. However, when permitted to run as a tape, it will be electrostatically charged by friction, or when a wound tape is unwound for running, a so-called peeling electrostatic charge will be created when the magnetic surface departs from the substrate surface, whereby dusts, foregin matters or fine powders fallen off from the substrate or the magnetic surface, are likely to deposit on the magnetic surface, thus leading to dropouts. In recent years, the thickness of the substrate film is often as thin as 11 $\mu$m or less, and an extremely thin high performance magnetic layer is formed on its surface, whereby it is necessary to minimize the spacing between the magnetic head and the magnetic surface of the tape for high frequency recording. In such a case, even a small amount of foreign matters or dusts, gives a substantial influence to the spacing and gives rise to dropouts.

Further, a magnetic recording medium with a thin magnetic layer formed on a primer coating layer, has a substantial degree of light transmittance, which causes an operation error for an optical control such as an automatic stopping control for the video tapes or measuring tapes.

These drawbacks can be overcome by forming a backing layer on the rear side of the substrate i.e. on the side opposite to the side on which the magnetic layer is formed and dispersing a conductive powder such as carbon black in the backing layer to obtain a magnetic recording medium having a predetermined electric conductivity. However, the backing layer is formed as a separate layer independent of the primer coating layer, and therefore requires an additional step for its formation.

SUMMARY OF THE INVENTION

It is an object of the present invention to provide a magnetic recording medium which has a low electrostatic property even without the above-mentioned backing layer and which is capable of minimizing dropouts.

The present invention provides a magnetic recording medium comprising a transparent plastic film substrate, a primer coating layer formed on the substrate and a magnetic layer for magnetic recording formed on the primer coating layer, wherein said primer coating layer is formed by dispersing carbon black in a radiation curable coating material composed essentially of at least one oligomer or polymer containing at least one radiation curable unsaturated double bond per molecule and curing the resulting dispersion by radiation.

In short, the present invention provides a magnetic recording medium having a low electrostatic property, excellent surface smoothness and good adhesion of the magnetic layer by using, as the primer coating layer, a dispersion of carbon black in a radiation curable coating material composed of molecules containing radiation sensitive (radiation curable) double bonds.

The electroconductive material is dispersed only in the primer coating layer and not in the magnetic layer. Nevertheless, the surface resistance of the magnetic layer is substantially reduced by the presence of the primer coating layer, whereby it is possible to minimize the electrostatic charge and the consequential problems such as sticking of the tape or the dropouts, and it is possible to overcome a problem that the tape winding deteriorates during the use or during the process for the production.

Further, carbon black makes the recording medium opaque i.e. light non-transmitting, whereby the above-mentioned problem of the operation error resulting from the detection error in the optical control can be avoided.

DETAILED DESCRIPTION OF THE PREFERRED EMBODIMENTS

The resin component of the radiation curable coating material to be used in the present invention, includes oligomers or polymers containing at least one radiation curable unsaturated double bond per molecule, such as an acrylic double bond, an allyl-type double bond, a maleic double bond or other radiation curable double bonds. It is preferred to use a compound containing at least two (meth) acryloyl groups per molecule, the molecular weight being at least 200 per each acryloyl group. If the molecular weight per (meth) acryloyl group is less than 200, the resin component tends to undergo a substantial volumetric shrinkage at the time of the crosslinking (curing) reaction, whereby the substrate will be curled, thus leading to poor dimensional stability and deterioration of the adhesion of the magnetic layer.

Among low molecular weight monomers, there are many compounds having low boiling points, which tend to evaporate during the drying and curing operation, and are likely to create an industrial problem. However, even such low molecular monomers may provide excellent properties when used in combination with a resin component having a high molecular weight.

In the case where two or more radiation curable oligomers or polymers are used in combination, it is particularly advantageous to employ a radiation curable coating material containing at least two components selected from the group consisting of the following (A), (B) and (C):

(A) a compound containing at least two radiation curable unsaturated double bonds and having a molecular weight of at least 5000, preferably at least 8000;

(B) a compound containing at least one radiation curable unsaturated double bond and having a molecular weight of at least 400 and less than 5000, preferably from 600 to 3000; and (C) a compound containing at least one radiation curable unsaturated double bond and having a molecular weight of less than 400.

It is particularly preferred that the radiation curable coating material comprises at least two components selected from the groups (A), (B) and (C) in the respective proportions of from 0 to 90% by weight of (A), from 0 to 80% by weight of (B) and from 0 to 50% by weight of (C). Further, it is also possible to employ a radiation curable coating material comprising (A) and (B) in the respective proportions of from 20 to 95% by weight of (A) and from 5 to 80% by weight of (B). The radiation curable coating material may contain from 1 to 10% by weight of a photosensitizer for photopolymerization.

Specific examples of these compounds are as follows:

I. A reaction product obtained by reacting one molecule of a compound having at least one hydroxyl group per molecule with one isocyanate group of at least one molecule of a polyisocyanate compound, followed by the reaction with at least one molecule of a monomer containing a group reactive with an isocyanate group and a radiation curable unsaturated double bond:

There may be mentioned a resin, prepolymer, oligomer or telomer having two acrylic double bonds at the terminals of the molecule, which is obtained by reacting 2 mols of toluene diisocyanate with 1 mol of a bifunctional polyether obtained by the addition of propylene oxide to propylene glycol (Adeka Polyether P-1000, manufactured by Asahi Denka Kogyo K.K.), followed by the reaction with 2 mols of 2-hydroxyethyl methacrylate.

As the compound containing at least one hydroxyl group to be used here, there may be mentioned a polyfunctional ether such as Adeka Polyether P-700, P-1000 or G-1500 (manufactured by Asahi Denka Kogyo K.K.), or Polymeg 1000 or 650 (manufactured by Quaker Oats Co.); a cellulose derivative such as nitrocellulose, acetyl cellulose or ethyl cellulose; a partially saponified vinyl chloride-vinyl acetate copolymer having a hydroxyl group such as Vinylite VAGH (manufactured by Union Carbide Co. U.S.A.); a polyvinyl alcohol; a polyvinyl formal; a polyvinyl butyral; a polyfunctional polyester such as Polycaprolactone PCP-0200, PCP-0240 or PCP-0300 (manufactured by Chisso Corporation); a saturated polyester resin obtained by esterification of a saturated polybasic acid such as phthalic acid, isophthalic acid, terephthalic acid, adipic acid, succinic acid or sebacic acid, with a polyhydric alcohol such as ethylene glycol, diethylene glycol, 1,4-butanediol, 1,3-butanediol, 1,2-propylene glycol, dipropylene glycol, 1,6-hexane glycol, neopentyl glycol, glycerin, trimethylolpropane or pentaerythritol; or an acrylic polymer containing at least one acrylic or methacrylic ester containing a hydroxyl group, as a polymer component.

As the polyisocyanate compound to be used here, there may be mentioned 2,4-toluene diisocyanate, 2,6-toluene diisocyanate, 1,4-xylene diisocyanate, m-phenylene diisocyanate, p-phenylene diisocyanate, hexamethylene diisocyanate, isophorone diisocyanate or Desmodule L or IL (manufactured by Bayer A.G., West Germany).

As the monomer containing a group reactive with an isocyanate group and a radiation curable unsaturated double bond, there may be mentioned an ester having a hydroxyl group such as a 2-hydroxy ethyl ester, 2-hydroxy propyl ester or 2-hydroxy octyl ester of acrylic or methacrylic acid; a monomer containing an active hydrogen reactive with an isocyanate group, such as an acryl amide, a methacryl amide or an N-methylol acrylamide; or a monomer containing an active hydrogen reactive with an isocyanate group and a radiation curable unsaturated double bond, such as an acryl alcohol, a maleic acid polyhydric alcohol ester, or a mono- or di-glyceride of a long chain fatty acid having an unsaturated double bond.

II. A reaction product obtained by reacting one molecule of a compound having at least one epoxy group per molecule with at least one molecule of a monomer having a group reactive with an epoxy group and electron beam-curable double bond:

There may be mentioned, for instance, a resin, prepolymer or oligomer containing an acrylic double bond as a pendant group in the molecule, which is prepared by reacting acrylic acid to an epoxy group-containing thermoplastic resin obtained by the radical polymerization of glycidyl acrylate or glycidyl methacrylate, so that the carboxyl group and the epoxy group undergo a ring-opening reaction to form the acrylic double bond as a pendant group, or a resin, prepolymer or oligomer containing a radiation curable unsaturated double bond in the main chain of the molecule, which is prepared by reacting maleic acid to the above-mentioned thermoplastic resin so that the carboxyl group and the epoxy group undergo a ring-opening reaction to form the radiation curable unsaturated double bond in the main chain.

As the compound containing at least one epoxy group per molecule, there may be mentioned a homopolymer of an acrylic ester or methacrylic ester containing an epoxy group, such as glycidyl acrylate or glycidyl methacrylate, or its copolymer with another polymerizable monomer; or various other epoxy resins such as Epikote 818, 1001, 1007 or 1009 (manufactured by Shell Chemical Company).

As the monomer containing a group reactive with an epoxy group and a radiation curable unsaturated double bond, there may be employed a polybasic acid monomer containing a radiation curable unsaturated double bond, such as maleic acid, fumaric acid, crotonic acid or undecylenic acid, as well as an acrylic monomer containing a carboxyl group, such as acrylic acid or methacrylic acid, or an acrylic monomer containing a primary or secondary amino group, such as methyl amino ethyl acrylate or methyl amino methacrylate.

III. A reaction product obtained by reacting one molecule of a compound containing at least one carboxyl group per molecule, with at least one molecule of a monomer containing a group reactive with a carboxyl group and a radiation curable unsaturated double bond:

There may be mentioned, for instance, a resin, prepolymer or oligomer containing an acrylic double bond in the molecule, which is prepared by reacting glycidyl methacrylate to a carboxyl group-containing thermoplastic resin obtained by the solution polymerization of methacrylic acid, so that the carboxyl group and the epoxy group undergo a ring-opening reaction in the same manner as mentioned in the above item II to form the acrylic double bond in the molecule.

As the compound containing at least one carboxyl group per molecule, there may be mentioned a polyester containing a carboxyl group; or a homopolymer of a radical-polymerizable monomer having a carboxyl group such as acrylic acid, methacrylic acid, maleic anhydride or fumaric acid or its copolymer with another polymerizable monomer.

As the monomer containing a group reactive with a carboxyl group and a radiation curable unsaturated double bond, there may be mentioned glycidyl acrylate or glycidyl methacrylate.

IV. A polyester compound containing a radiation curable unsaturated double bond in the molecular chain:

There may be mentioned an unsaturated polyester resin, prepolymer or oligomer containing a radiation curable unsaturated double bond, which is a saturated polyester resin obtained by esterification of the polybasic acid with the polyhydric alcohol as mentioned in the above item I, wherein a part of the polybasic acid is maleic acid.

The polybasic acid component and the polyhydric alcohol component of the saturated polyester resin may be the compounds as mentioned in the above item I. The radiation curable unsaturated double bond may be provided by maleic acid or fumaric acid.

The radiation curable unsaturated polyester resin may be prepared by adding maleic acid, fumaric acid, etc. to at least one polybasic acid component and at least one polyhydric alcohol component, and subjecting the mixture to a dehydration or alcohol removal reaction by a common method, namely, in a nitrogen atmosphere at a temperature of from 180° to 200° C. in the presence of a catalyst, raising the temperature to 240° to 280° C., and conducting the condensation reaction under reduced pressure of from 0.5 to 1 mmHg to obtain a polyester resin. The content of the maleic acid or fumaric acid is usually from 1 to 40 mol %, preferably from 10 to 30 mol %, in the acid component, in view of the crosslinking during the preparation and the radiation curing property.

V. A low molecular weight compound containing a radiation curable unsaturated double bond may also be used depending upon the particular purpose. As such a low molecular weight compound, there may be mentioned styrene, ethyl acrylate, ethylene glycol diacrylate, ethylene glycol dimethacrylate, diethylene glycol diacrylate, diethylene glycol dimethacrylate, 1,6-hexane glycol diacrylate, 1,6-hexane glycol dimethacrylate, trimethylolpropane triacrylate or trimethylolpropane trimethacrylate. (Compounds in item V are mainly compounds for component (C).)

The radiation curable coating material in the present invention is obtainable by using the compounds mentioned in items I to V. The compound containing an acrylic double bond and having a molecular weight of at least 400, may, be used alone. However, in such a case, as the molecular weight increases, the electron beam-curing property tends to decrease in connection with the density of the functional groups, whereby a higher radiation dose will be required, and the heat resistance tends to be poor as the curing property decreases. Further, in some cases, the adhesion of the magnetic layer tends to be impaired as the curing property increases.

On the other hand, in the case of an electron beam-curable resin having a molecular weight of less than 400, there will be a problem in the adhesion of the magnetic layer, although the electron curing property, the solvent resistance and the heat resistance will be improved. Thus, when a compound containing an acrylic double bond and having a molecular weight of at least 400 or less than 400, is used alone, it is rather difficult to obtian a primer coating material which satisfies various requirements in a well-balanced condition for various characteristics required for a magnetic recording medium.

Whereas, it is readily possible to obtain satisfactory adhesion and curing property by a combination of at least two compounds having different molecular weights.

If necessary, a non-reactive solvent may be used in the present invention. There is no particular restriction as to such a solvent. The solvent may be optionally selected taking the compatibility and the solubility of the binder into consideration. For instance, there may be mentioned a ketone such as acetone, methyl ethyl ketone, methyl isobutyl ketone or cyclohexanone; an ester such as ethyl formate, ethyl acetate or butyl acetate; an alcohol such as methanol, ethanol, isopropanol or butanol; an aromatic hydrocarbon such as toluene, xylene or ethylbenzene; an ether such as isopropyl ether, ethyl ether or dioxane; or a furan such as tetrahydrofuran or furfural. These solvents may be used alone or in combination as a solvent mixture.

For the magnetic layer of the present invention, a thermoplastic resin or thermosetting resin may be used as a vehicle. It is also possible to use the same radiation curable resin as used for the primer coating layer. In such a case, the application of radiation to the primer coating layer and the magnetic layer may be conducted simultaneously.

As the substrate on which the primer coating layer and the magnetic layer are formed according to the present invention, there may be employed a polyethylene terephthalate film which is presently widely used as the substrate for magnetic recording media, or a polyimide film or a polyamide film in a case where heat resistance is required. In the case of a polyester film, a thin base film may, in many cases, be subjected to monoaxial or biaxial stretching treatment. Further, in some cases, a coated paper material is used as the substrate.

As the radiation to be used for the crosslinking or curing of the radiation curable coating material of the present invention, there may be employed electron beams generated from an electron beam accelerator, $\gamma$-rays generated from $Co^{60}$, $\beta$-rays generated from $Sr^{90}$, X-rays generated from an X ray generator and ultraviolet rays. As the radiation source, it is particularly advantageous to use electron beams generated by an electron accelerator or ultraviolet rays, from the viewpoints of the control of the absorbed dose, the introduction to the production line and the shielding of the ionized radiation.

With respect to the electron characteristics for curing the magnetic layer, it is advantageous to conduct the radiation by means of an electron accelerator having an acceleration voltage of from 100 to 750 KV, preferably from 150 to 300 KV in view of the transmittance, at an absorbed dose of from 0.5 to 20 Mrad.

A photosensitizer may be incorporated into the radiation curable coating material of the present invention to make it suitable for ultraviolet curing. As such a photosensitizer, there may be employed conventional sensitizers, for example, a benzoin type sensitizer such as benzoin methyl ether, benzoin ethyl ether, α-methyl benzoin or α-chlorodeoxybenzoin; a ketone such as benzophenone or an acetophenone bisdialkylaminobenzophenone; a quinone such as anthraquinone or phenanthraquinone; or a sulfide such as benzyl disulfide or tetramethylthiuram disulfide. The photosentisizer is used in an amount of from 0.1 to 10% by weight relative to the resin solid content.

Now, the present invention will be described in further detail with reference to Examples and Comparative Examples. However, it should be understood that the present invention is by no means restricted by these specific Examples. In the Examples, "parts" and "%" mean "parts by weight" and "% by weight", respectively. Prior to the Examples, the preparation of resins will be described.

Resin Preparation (a)

100 parts of a copolymer having a composition of vinyl chloride/vinyl acetate/vinyl alcohol in a weight ratio of 93/2/5% and having a molecular weight of 18000, is heated and dissolved in 238 parts of toluene and 95 parts of cyclohexanone. The solution was heated to 80° C., and 7.5 parts of the after-mentioned TDI adduct was added. Further, 0.002 part of tin octylate and 0.002 part of hydroquinone were added. The mixture was reacted at 82° C. in a nitrogen gas stream until the conversion of isocyanate (NCO) reached at least 90%. After the reaction, the reaction mixture was cooled and diluted with an addition of 238 parts of methyl ethyl ketone. The resin composition thereby obtained was designated as Resin Composition (a). The molecular weight of this resin was 19200, and the molecular weight per methacryloyl group was about 4400.

Preparation of the TDI Adduct 348 parts of tolylene diisocyanate (TDI) was heated to a temperature of 80° C. in a four-necked flask having a capacity of one liter in a nitrogen stream. Then, 260 parts of 2-hydroxy ethyl methacrylate (2 HEMA), 0.07 part of tin octylate and 0.05 part of hydroquinone were added dropwise into the reaction vessel, while cooling to control the temperature in the reaction vessel to be within a range of from 80° to 85° C. After completion of the dropwise addition, the reaction mixture was stirred at 80° C. for 3 hours to complete the reaction. After the completion of the reaction, the reaction product was taken out and cooled to obtain a 2 HEMA adduct of TDI as a white paste.

Resin Preparation (b)

100 parts of a saturated polyester resin (L-411 manufactured by Dynamit-Nobel Co.) was heated and dissolved in 116 parts of toluene and 116 parts of methyl ethyl ketone. The solution was heated to 80° C., and 2.84 parts of an isophorone diisocyanate adduct prepared in the same manner as in Resin Preparation (a) was added. Further, 0.006 part of tin octylate and 0.006 part of hydroquinone were added thereto, and the mixture was reacted in a nitrogen gas stream at 80° C. until the NCO conversion reached at least 90%.

The resin composition thereby obtained was designated as Resin Composition (c). The molecular weight of this resin was 20600.

Resin Preparation (c)

291.2 parts of dimethyl terephthalate, 291.2 parts of dimethylisophthalate, 64.8 parts of dimethyl maleate, 251.2 parts of ethylene glycol, 6.48 parts of 1,4-butanediol, 81.2 parts of 1,3-butane diol and 4.0 parts of tetra-n-butyl titanate, were fed in a reaction vessel and subjected to a methanol removal reaction in a nitrogen gas stream at 180° C. Then, the reaction mixture was heated to 240° to 260° C. and subjected to a condensation reaction under reduced pressure of from 0.5 to 1 mmHg to obtain a linear unsaturated polyester resin having a moledular weight of 8000.

Resin Preparation (d)

250 parts of NIAX polyol PCP-0200 (a polycaprolactone manufactured by Chisso Corporation), 122.2 parts of 2-hydroxyethyl methacrylate, 0.024 part of hydroquinone and 0.033 part of tin octylate, were fed in a reaction vessel, heated to 80° C. and dissolved. Then, 163.6 parts of TDI was dropwise added, while cooling to control the temperature in the reaction vessel to be within a range of from 80° to 90° C. After the completion of the dropwise addition, the mixture was reacted at 80° C. until the NCO conversion reached at least 95%.

The resin composition thereby obtained was designated as Resin Composition (d). The molecular weight of this resin was 1140. The molecular weight per methacryloyl group of this resin was about 600.

Resin Preparation (e)

148 parts of phthalic anhydride, 65 parts of 1,3-butane diol, 30 parts of ethylene glycol and 2.5 parts of p-toluene sulfonic acid, were fed into a reaction vessel, and subjected to an esterification reaction in a nitrogen gas stream at 150° C. for 1 hour and then at 180° C. for 5 hours. Then, the reaction mixture was cooled to 100° C., and 0.3 part of hydroquinone and 28 parts of acrylic acid were added. The mixture was subjected to an esterification reaction for 15 hours to obtain an oligo ester acrylate having a molecular weight of 2000. The molecular weight per acryloyl group of this resin was about 650.

Resin Preparation (f)

250 parts of Adeka Polyether P-1000 (a polyether manufactured by Asahi Denka Kogyo K.K.), 65 parts of 2-hydroxyethyl methacrylate, 0.013 part of hydroquinone and 0.017 part of tin octylate were fed into a reaction vessel, heated to 80° C. and dissolved. Then, 87.0 parts of TDI was dropwise added, while cooling to control the temperature in the reaction vessel to be within a range of from 80° to 90° C. After completion of the dropwise addition, the reaction mixture was reacted at 80° C. until the NCO conversion reached at least 95%.

The resin composition thereby obtained was designated as Resin Composition (f). The molecular weight of this resin was 1610, and the molecular weight per methacrylol group was about 800.

The carbon black to be dispersed in the above-mentioned resin or in a mixture of the above-mentioned resin with the foregoing component V, has an average particle size of from 10 to 300 μm, and it is used in an amount of from about 5 to about 200 parts per 100 parts of the resin component. From the aspect of the light transmittance, the carbon black is incorporated usually in an amount of at least about 10 parts. From the aspect of the antistatic property, the carbon black may be incorporated in an amount of at least 5 parts. For instance, in the case of a combination of a magnetic layer formed in a dry thickness of 3 μm by dispersing an acicular alloy magnetic powder in the magnetic layer and a primer coating layer formed in a dry thickness of 0.1 μm, the light transmittance can be suppressed to a level of at most 1% by incorporating about 10 parts by weight of carbon black per 100 parts by weight of the resin. It has been further found that in this case, the surface resistance of the magnetic layer can be reduced to a level of from $10^8$ to $10^7$ Ω/cm$^2$ as compared with $10^{11}$ Ω/cm$^2$ in the case where a primer coating layer containing no carbon black was employed.

EXAMPLE 1

40 parts of the above-mentioned resin composition (a), 4 parts of carbon black (20 mμm) and 60 parts of a solvent (toluene/methyl ethyl ketone=1/1) were mixed and dissolved to obtain a radiation curable coating material. This coating material was applied onto a polyester film and dried to obtain a dried layer having a thickness of 0.5 μm. Then, electron beam radiation was applied by means of an electro curtain-type electron beam accelerator manufactured by ESI Co., at a radiation dose of 2 Mrad in a nitrogen atmosphere, whereby a cross-linked, cured primer coating layer was obtained.

Then, a magnetic coating material having the following composition was applied thereon and dried to obtain a dried layer having a thickness of 2.5 μm. The product was then subjected to surface smoothing treatment and cut in a width of ½ inch to obtain a video tape.

Preparation of the Magnetic Coating Material

| | |
|---|---|
| Nitrocellulose (H ½" manufactured by Asahi Chemical Industry Co., Ltd.) | 8 parts |
| VAGH (manufactured by Union Carbide Co.) | 10 parts |
| Urethane elastomer (Ester 5703, manufactured by Goodrich Co.) | 9 parts |
| Methyl isobutyl ketone | 150 parts |
| Cyclohexane | 50 parts |
| To the resin solution having the above composition; | |
| Fe—Ni—Co alloy powder | 100 parts |
| α-Al$_2$O$_3$ (0.5 μm powder) | 2 parts |
| Lubricant (Higher fatty acid-modified silicone oil) | 1 part |
| Dispersant (Soybean oil purified lecitin) | 3 parts | were added and thoroughly dispersed for 24 hours in a ball mill to obtain a magnetic coating material.

EXAMPLE 2

| | |
|---|---|
| Carbon black (60 mμm) | 20 parts |
| Resin Composition (a) | 40 parts |
| Resin Composition (b) | 4 parts |
| Solvent (toluene/methyl ethyl ketone = 1/1) | 56 parts |

The mixture having the above composition was thoroughly mixed and dissolved to obtain a radiation curable primer coating material. This coating material was applied onto a polyester film and dried. Then, electron beams were irradiated by means of an electro curtain type electron beam accelerator manufactured by ESI at an acceleration voltage of 160 KV, at an electrode current of 10 mA at a radiation dose of 3 Mrad in a nitrogen atmosphere, whereby the coated layer was cured to form a primer coating layer. Then, a magnetic layer was formed in the same manner as in Example 1.

EXAMPLE 3

| | |
|---|---|
| Carbon black (80 mμm) | 10 parts |
| Resin Composition (c) | 7 parts |
| NK ester-A-4G (manufactured by Shin Nakamura Kagaku K.K.) | 3 parts |
| Solvent (toluene/methyl ethyl ketone = 1/1) | 90 parts |

The mixture having the above composition was thoroughly mixed and dissolved to obtain a radiation curable primer coating material. This coating material was applied onto a polyester film and dried to obtain a dried layer having a thickness of 0.2 μm. Then, the electron beam radiation was conducted at a radiation dose of 5 Mrad in a nitrogen atmosphere, whereby a cross-linked cured primer coating layer was formed. Then, a magnetic layer was formed in the same manner as in Example 1, and a video tape was prepared.

EXAMPLE 4

| | |
|---|---|
| Carbon black (30 mμm) | 5 parts |
| Resin Composition (b) | 6 parts |
| Resin Composition (e) | 3 parts |
| 1,6-hexane glycol diacrylate | 1 part |
| Solvent (toluene/methyl ethyl ketone = | 90 parts |

-continued

| 1/1) | |
|---|---|

The mixture having the above composition was thoroughly mixed and dissolved to obtain a radiation curable primer coating material. This coating material was applied onto a polyester film and dried to obtain a dried layer having a thickness of 0.1 μm. Then, the electron beam radiation was conducted at a radiation dose of 2 Mrad in a nitrogen atmosphere, whereby a cross-linked cured primer coating layer was formed. Then, the following magnetic layer was formed thereon.

| (Radiation curable magnetic layer) | |
|---|---|
| Magnetic powder (Co-adsorbed iron oxide; length: 0.3 μm; diameter: 0.04 μm; Hc: 1100 Oe) | 100 parts |
| Dispersant (oleic acid) | 2 parts |
| Solvent (methyl ethyl ketone/toluene = 50/50) | 100 parts |

The above composition was mixed for 3 hours in a high power mixer, and then mixed with the following composition:

| Acrylic double bond-containing polyester urethane oligomer | 10 parts |
|---|---|
| Vinilite VAGH | 5 parts |
| Acrylic double bond-containing polyether urethane oligomer | 10 parts |
| Solvent (methyl ethyl ketone/toluene = 50/50) | 200 parts |
| Higher fatty acid (myristic acid) | 3 parts | to obtain a magnetic coating material in the same manner as in Example 1. This magnetic coating material was applied in the same manner, followed by surface smoothing treatment. Then, electron beams were irradiated thereto at an acceleration voltage of 150 KeV, at an electrode current of 10 mA and at an absorbed dose of 5 Mrad in a nitrogen atmosphere to cure the coated layer.

COMPARATIVE EXAMPLE 1

| Vinyl chloride-vinyl acetate copolymer (VAGH manufactured by Union Carbide Co.) | 10 parts |
|---|---|
| Solvent (toluene/methyl ethyl ketone = 1/1) | 90 parts |

A video tape was prepared by forming a magnetic layer in the same manner as in Example 1 except that a coating material obtained by mixing and dissolving the above composition, was applied onto a polyester film and dried to form a primer coating layer having a thickness of 0.1 μm.

COMPARATIVE EXAMPLE 2

| Resin Composition (a) | 50 parts |
|---|---|
| Solvent (toluene/methyl ethyl ketone = 1/1) | 50 parts |

The above composition was mixed and dissolved to obtain a radiation curable coating material, and a video tape was prepared in the same manner as in Example 1.

With respect to samples obtained in Examples 1 to 4 and Comparative Example 1 and 2, the peeling strength of the coating layers and the video sensitivity (RF 4MHZ) by means of a VHS deck, were measured. The results thereby obtained are shown in Table 1.

As regards the adhesion, each sample having a primer coating layer showed a greater bonding strength than Comparative Examples 1 and 2 where no carbon black was incorporated.

As regards the light transmittance, each sample of the present invention had a light transmittance of not higher than 0.5%, thus showing substantially smaller percent transmission as compared with the samples of Comparative Examples 1 and 2.

Further, the surface resistance of the magnetic layer was at a level of from $10^7$ to $10^8$ $\Omega/cm^2$. From the numbers of the dropouts, it is evident that the samples of the present invention are distinctly superior to the samples of the Comparative Examples.

TABLE 1

| | Electric resistance $\Omega/cm^2$ | Dropout Once | Dropout 100 times | Tape winding condition | Tape winding condition during the running operation | Adhesion (g) | Percent transmission |
|---|---|---|---|---|---|---|---|
| Example 1 | $6 \times 10^7$ | 50 | 80 | Good | Good | 105 | 0.3 |
| Example 2 | $2 \times 10^7$ | 40 | 80 | Good | Good | 115 | 0.4 |
| Example 3 | $3 \times 10^7$ | 60 | 90 | Good | Good | 115 | 0.2 |
| Example 4 | $1 \times 10^8$ | 50 | 80 | Good | Good | 120 | 0.1 |
| Comparative Example 1 | $1 \times 10^{11}$ | 200 | 500 | Bad | Bad | 120 | 3.8 |
| Comparative Example 2 | $2 \times 10^{11}$ | 250 | 600 | Bad | Bad | 140 | 1.5 |

The dropouts were measured at a temperature of 40° C. under a relative humidity of 60%.

As described in the foregoing, according to the present invention, the electroconductivity is imparted only to the primer coating layer without any electroconductive treatment to the exposed surface of the recording medium, whereby the electrostatic charge can substantially be reduced and the tape winding condition can be improved, and whereby no step for forming a backing layer or a surface layer is required.

What is claimed is:

1. A magnetic recording medium comprising a transparent plastic film substrate, a primer coating layer formed on the substrate and a magnetic layer for magnetic recording formed on the primer coating layer, wherein said primer coating layer is formed by dispersing carbon black in a radiation curable coating material in an amount of 45–200 parts carbon black per 100 parts coating material composed essentially of at least one oligomer or polymer containing at least one radiation curable unsaturated double bond per molecule and curing the resulting dispersion by radiation, with the proviso that wherein said oligomer or polymer contains at least two acryloyl or methacryloyl groups per molecule, it has a molecular weight of at least 200 per each acryloyl or methacryloyl group.

2. The magnetic recording medium according to claim 1, wherein the radiation curable coating material is composed essentially of at least two compounds selected from the group consisting of (A) a compound containing at least two radiation curable unsaturated double bonds and having a molecular weight of at least 5,000, (B) a compound containing at least one radiation curable unsaturated double bond and having a molecular weight of at least 400 and less than 5,000, and (C) a compound containing at least one radiation curable unsaturated double bond and having a molecular weight of less than 400.

3. The magnetic recording medium according to claim 2, wherein the radiation curable coating material comprises from 0 to 90% by weight of the compound (A), from 0 to 80% by weight of the compound (B) and from 0 to 50% by weight of the compound (C) such that the total of said A, B and C is 100%.

4. The magnetic recording medium according to claim 2, wherein the radiation curable coating material comprises from 20 to 95% by weight of the compound (A) and from 5 to 80% by weight of the compound (B).

5. The magnetic recording medium according to claim 1, wherein the radiation curable coating material contains from 1 to 10% by weight of a photosensitizer for photopolymerization.

* * * * *